US008140407B2

(12) United States Patent
Ivory et al.

(10) Patent No.: US 8,140,407 B2
(45) Date of Patent: Mar. 20, 2012

(54) METHOD, SYSTEM, AND STORAGE MEDIUM FOR SUBSTITUTING MEDIA PREVIEW ITEMS FOR SUPPRESSED MEDIA PREVIEW ITEMS

(75) Inventors: Andrew J. Ivory, Wake Forest, NC (US); Barry J. Pellas, Durham, NC (US); Matthew T. Pellas, Raleigh, NC (US); Matthew K. Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 12/537,206

(22) Filed: Aug. 6, 2009

(65) Prior Publication Data

US 2011/0035258 A1    Feb. 10, 2011

(51) Int. Cl.
*G06Q 30/00* (2006.01)
*G06F 17/30* (2006.01)

(52) U.S. Cl. .............. 705/26.8; 705/26.1; 705/26.7; 705/27.1; 705/307; 725/60; 725/61; 725/86

(58) Field of Classification Search ........ 705/26.1–27.2, 705/307; 725/60–61, 86–142
See application file for complete search history.

(56) References Cited

U.S. PATENT DOCUMENTS

| 5,530,754 | A | 6/1996 | Garfinkle |
| 6,668,377 | B1 * | 12/2003 | Dunn ............................ 725/92 |
| 7,085,727 | B2 | 8/2006 | VanOrman |
| 2003/0135467 | A1 * | 7/2003 | Okamoto ...................... 705/52 |
| 2003/0154486 | A1 * | 8/2003 | Dunn et al. .................... 725/91 |
| 2004/0186783 | A1 * | 9/2004 | Knight et al. ................. 705/16 |
| 2005/0177386 | A1 | 8/2005 | Essa |
| 2008/0009270 | A1 * | 1/2008 | Volk et al. ................. 455/414.1 |
| 2009/0049464 | A1 * | 2/2009 | Kang ............................. 725/1 |
| 2010/0088716 | A1 * | 4/2010 | Ellanti et al. ................ 725/32 |
| 2011/0004904 | A1 * | 1/2011 | Green et al. ................. 725/40 |
| 2011/0090397 | A1 * | 4/2011 | Redmann et al. ........... 348/468 |

OTHER PUBLICATIONS

"Too much content but still nothing to watch". (SHOW TIME). Online Reporter , p. 18 Sep. 9, 2006.*
"How It Works", http://www.netflix.com/HowNetflixWorks?lnkctr=hcHIW, printed Aug. 5, 2009.

* cited by examiner

*Primary Examiner* — Will Allen
(74) *Attorney, Agent, or Firm* — Marcia L. Doubet (57) ABSTRACT

A user viewing a preview of a media title using a media player can elect to add that media title to a list for future use, such as a future rentals list maintained by a rental media provider. The media player communicates with the rental media provider for updating a list for the user which is stored at (or accessible to) the provider. Optionally, a filtering capability may be provided to suppress viewing of particular previews which are stored on media inserted into the media player (for example, because the user has already rented the previewed media title, because the preview does not match filtering criteria such as parental controls, etc.). The filtering may comprise preventing media titles from being added to the future rentals list. Optionally, substitute previews may be provided for the previews which are suppressed by the filtering.

12 Claims, 6 Drawing Sheets

| Session ID | Account ID |
|---|---|
| String | Integer |

| Session ID | Movie ID | User Selection | Preview List |
|---|---|---|---|
| String | String | List | List |

| Session ID | Conf. Message | Exit Code | Preview List | Preview List Stream |
|---|---|---|---|---|
| String | String | Integer | List | Stream |

METHOD, SYSTEM, AND STORAGE MEDIUM FOR SUBSTITUTING MEDIA PREVIEW ITEMS FOR SUPPRESSED MEDIA PREVIEW ITEMS

BACKGROUND OF THE INVENTION

The present invention relates to computing environments, and deals more particularly with enabling a media title corresponding to a currently-viewed preview to be added to a list for future use, such as a future rentals list or queue maintained by a rental media provider.

Rental of digital video discs ("DVDs") and other media containing movies, games, and so forth is a huge industry. (The terms "DVDs" and "media" are used herein to refer to these rental items for ease of reference, although it will be understood that the actual type of media is not limited to DVDs and may include media types as yet undeveloped.) Users may use playback devices such as DVD players coupled to televisions or gaming consoles for playback of the content recorded on the media.

BRIEF SUMMARY OF THE INVENTION

The present invention is directed to adding a previewed media title or titles to a list for future use. In one embodiment, this comprises: receiving, at a player device playing a preview of a media title stored on a medium readable by the player device, an indication of selection of the previewed media title; and signalling a media provider, by the player device over a communication channel responsive to receiving the indication, to add the selected media title to a list usable by the media provider for future use. The previewed media titles may be, by way of example, movies or video games. The signalled media provider may comprise a rental media provider and the list may comprise a future rentals list usable by the rental media provider for determining media content to be rented to a user. The player device may play at least two of a plurality of previews of media titles stored on the medium, in which case the receiving may receive an indication of each selected one of the played previews of media titles and the signalling may signal the media provider to add each selected one of the previewed media titles to the list.

Optionally, an embodiment of the present invention may provide filtering. This may comprise suppressing the playing of at least one of a plurality of previews by filtering the plurality of previews based on filtering criteria, and optionally, playing a substitute preview in place of at least one of the previews to be suppressed. The filtering may be based on filtering criteria of various types, such as user preferences or by determining whether a media title is already on the list.

In another embodiment, a system for adding media titles to a list for future use comprises: a player device for playing a first media title stored on a recording medium and for playing a preview of each of a plurality of media titles that are stored on the recording medium and that differ from the first media title, the player device comprising a processor; and instructions which are executable, using the processor, to implement functions comprising: receiving an indication of selection of at least one of the media titles during the playing of the preview of that media title; and signalling a media provider, by the player device over a communication channel responsive to receiving the indication, to add each selected one of the previewed media titles to a list usable by the media provider for future use.

Another embodiment comprises: receiving, at a media provider over a communication channel from a player device that plays a plurality of media title previews from a recording medium that stores a media title which differs from media titles corresponding to the media title previews, a message indicating each of at least one of the media title previews which were selected by a user, during the playing of the previews, for adding the corresponding media title to a list maintained by the media provider; and adding the media title corresponding to each of the selected media title previews indicated in the message, by the media provider, to the list. The media provider may suppress the adding of any of the media titles for which filtering criteria are not met.

Embodiments of these and other aspects of the present invention may be provided as method, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

DETAILED DESCRIPTION OF THE INVENTION

Embodiments of the present invention are directed toward enabling a media title corresponding to a currently-viewed preview to be added to a list for future use. The list may comprise a future rentals list—that is, a queue or list of titles the user wishes to rent in the future. (The term "title" is used herein to refer to an identifier of particular media content. While this identifier may comprise the name of the content, such as the name of a particular movie, it may alternatively comprise another identifier of the media content such as a numeric or alphanumeric code.) An embodiment of the present invention enables users to add a media title to the future rentals list while viewing previews during the "previews" section of a DVD containing a movie, game, or other title which is being viewed on a device such as a television or gaming console. This enables the user to essentially pre-order a future title based on what that user is currently viewing. In this manner, the user does not need to remember what previews of movies, games, etc. were viewed by that user and which caused that user to want to rent a certain title.

Providers of rental media such as DVDs commonly provide Web sites where users can subscribe to the rental service and can also manage their subscription. One example of a rental media provider that provides movie rentals is Netflix, Inc., and one example of a rental media provider that provides video game rentals is GameFly, Inc. Managing a subscription from such Web sites typically includes allowing users to view available titles and select, from those that seem interesting, to add one or more titles to a list or queue of future rentals. Once a user has received one of the DVDs from the list, used it, and returned it to the provider, this future rentals list is typically consulted so that one or more of the DVDs on the future rentals list can be automatically sent to the user.

The rental media may contain a number of previews that advertise other media content or titles. For example, a DVD containing a movie may include previews which are commonly referred to as "trailers" for several other movies, and a disk containing a video game may include previews of several other video games. When the user watches these previews, one or more of them may seem interesting to the user. For a user watching previews on his television using existing techniques, after the user sees these interesting previews, he may go to his computer to open a session (e.g., using the Internet) with his rental media provider and manually add the corresponding title(s) to his future rentals list. This can be inconvenient, however, as the user has to switch between devices and has to remember the desired title(s) and find the corresponding entry for each title at the rental media provider's Web site—which may represent a massive catalog that contains thousands of different titles. It may therefore be difficult for a user to find the title(s) he wanted without expending a large amount of time, leading to user frustration.

In some cases, a user may be viewing previews on the Internet rather than using a stand-alone device such as a television. For example, the user might view previews of video games from a Web site of the game developer. Again, if the user has to open up a separate session with the user's rental media provider, the user may have difficulty finding a previewed title in order to manually add it to his future rentals list.

Some rental media provider Web sites allow users to watch previews directly from that Web site, and then enable the user to add that title to the future rental list by selecting a graphical button on the Web page. Adding a title to a future rentals list while viewing a preview directly from the provider's Web site is distinct from an embodiment of the present invention.

An embodiment of the present invention may use an on-screen display interface through which the user can select to add a title to the future rentals list. In one aspect, if the selected title is not yet available for rental, feedback to that effect may be provided to the user. For example, after communicating the user's preview selection over a communications link to the rental content provider, the rental content provider may determine that this title has not yet been released; a message may then be transmitted from the rental content provider to the user's device over the communications link, informing the user of this information.

Optionally, an embodiment of the present invention may provide filtering. Suppose, for example, that a particular movie DVD includes 5 trailers that each advertise another movie. If the user has previously rented 2 of those movies from the rental content provider—or if those 2 movies are already in the user's future rentals list—then this information can be used to suppress the playing of those previews. In addition or instead, the filtering may comprise applying user preferences to suppress playing the previews of movies according to particular criteria (which may be stored, for example, as configuration data). As one example, the user might select a parental controls option that will suppress any movie previews which have been coded as having violent content. The filtering might also, or alternatively, suppress movie previews according to other types of user preferences established as filtering criteria for this user—for example, the user might wish to avoid seeing previews in the horror film genre or previews of any movie featuring a particular actor or actress. In addition to or instead of actually suppressing the playing of the previews, the filtering may comprise not allowing titles to be added to the future rentals list based on the filtering criteria. Optionally, when the filtering results in previewing of one or more titles being suppressed, substitute titles may be provided for previewing, where these substitute titles are automatically selected by the rental media provider (e.g., by reviewing the past rental habits of the user). Video games are commonly coded in a similar way to that of movies, and filtering of video game titles may be achieved in a similar manner.

Figure 1:
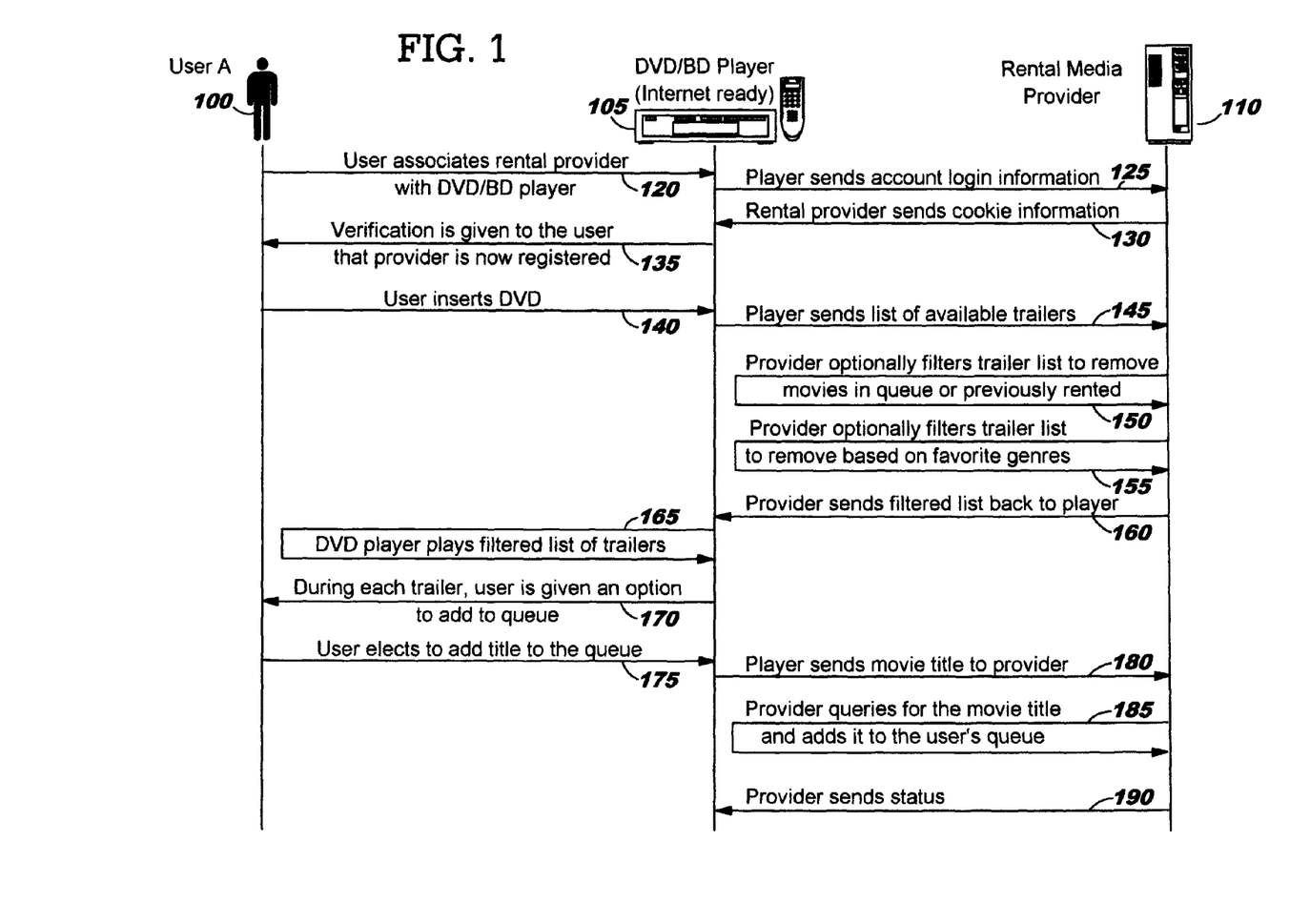
FIG. 1 illustrates sample control and message flows that may occur when using an embodiment of the present invention.

FIG. 1 illustrates sample control and message flows that may occur when using an embodiment of the present invention. As shown therein, a user identified as "User A" 100 has a media player 105, such as a DVD player or Blu-Ray Disk ("BD") player, and this player 105 is capable of communicating over a session (using a communication channel such as an Internet connection) to a rental media provider 110—that is, to a Web site or server of the rental media provider. (The media player 105 may be referred to equivalently as a "playback device".) It should be noted that FIG. 1 refers to the media as a DVD containing previews that comprise movie trailers, although this is by way of illustration only; the approach shown in FIG. 1 is applicable to media types other than DVDs and to content types other than movies.

In the approach illustrated in FIG. 1, the user 105 associates his rental media provider 110 with his player 105. See flow 120, where this is depicted. This association may comprise providing identifying information such as an account identifier, as well as a log-on password, to the player 105, where the account identifier identifies the user's subscription account with the rental media provider 110. A user interface may be provided from the player 105, for example, that prompts the user to provide the account identifier and password. As another example, the player 105 may be preconfigured with identifying information such as an account identifier and password. (The term "account identifier" is used herein to signify information that enables identifying the user's subscription account for purposes of establishing a session therewith. A user password may be optional, depending on the type of identifying information known to the media player 105.)

Figure 2:
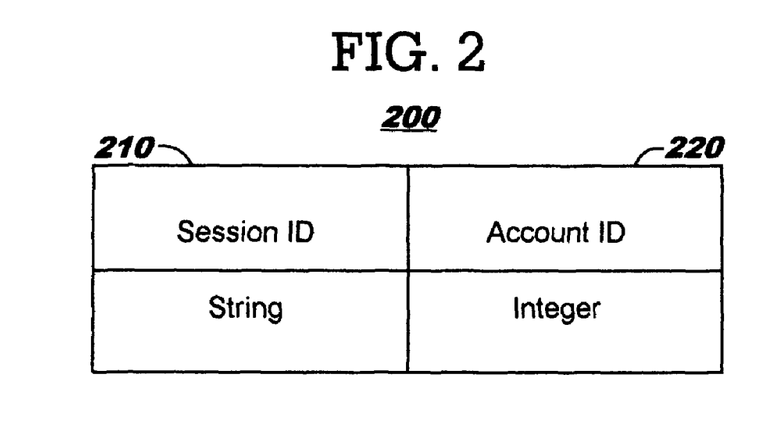
FIGS. 2-4 illustrate sample data structures that may be used by an embodiment of the present invention for storing information.

FIG. 2 illustrates a sample data structure 200 that may be used for storing information at the player 105. In this example, a session identifier field 210 is provided for storing session information for communicating with the user's subscription account at rental media provider 110, and may comprise a string value. An account identifier field 220 is also provided in this example, and stores information for logging on to the user's subscription account. The value of field 220 may comprise an integer value.

Referring again to FIG. 1, the player 105 that plays media containing previews for viewing by the user 100 (e.g., using a television that is operably connected to the player) sends a message 125 to the provider 110, where this message contains account log-on information. The log-on information is preferably obtained from data structure 200 of FIG. 2. Responsive to receiving this log-on information, the provider retrieves previously-stored information and returns that information in a response message 130. The response message 130 may contain a cookie or other data structure, and may be used for identifying a new session or a persistent, ongoing session between the provider 110 and device 105 (where use of a cookie may obviate the need for user 100 to supply his password each time the player 105 and provider 110 communicate with one another).

Verification may be provided to the user, as shown at 135, to indicate that the provider 110 is now registered with player 105. This verification may comprise displaying a message on an interface of the player 105. As another approach, a message may be displayed on a television operably connected to player 105.

Flow 140 of FIG. 1 depicts the user 100 inserting a DVD into the player 105. This DVD may contain a number of different previews, as noted earlier. Each of these previews preferably has an identifier corresponding thereto, where this identifier is stored on the DVD. For example, a data structure storing an array or list of preview identifiers may be present on the DVD. The identifier may comprise a name of the movie represented by the preview, or it may comprise another type of value usable for identifying the movie. Once the player 105 reads the DVD and obtains the identifiers of the previews stored thereon, it may build a message containing the identifiers and transmit that message to the provider for filtering, as shown at 145.

Figure 3:
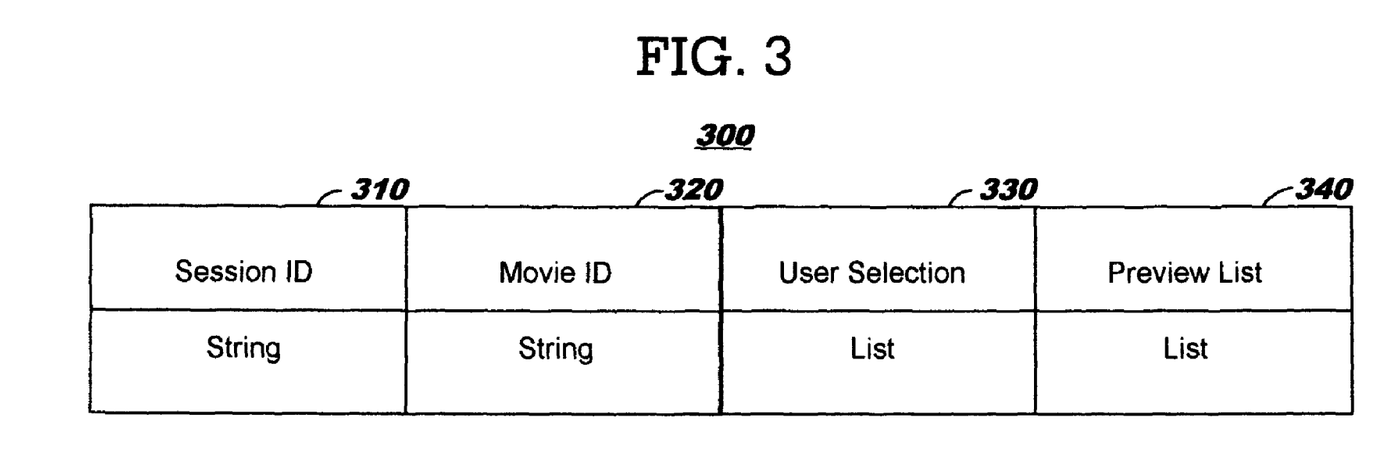

FIG. 3 illustrates a sample data structure 300 that may be stored at player 105 and used for transmitting information to provider 110 (for example, in message flows 145 and 180 of FIG. 1). In this example, a session identifier field 310 is provided for storing session information for the current session with the user's subscription account at rental media provider 110, and may comprise a string value (which may be identical to the value stored at 210 of FIG. 2). A movie identifier field 320 is also provided in this example, and stores a unique identifier of the movie stored on the DVD which is currently inserted in the player 105. The value of field 320 may comprise a string value. A user selection field 330 stores information to identify the previews which are selected by the user for adding to the user's future rentals list. The value of field 330 may comprise a list or an array (or as one alternative, a pointer thereto). Field 330 is preferably initialized to a null or zero value, which is then replaced with the user's actual selection(s) during the processing described below with reference to flows 170-175. A preview list field 340 may also be provided in data structure 300, where the value of this field 340 may comprise a list or an array (or as one alternative, a pointer thereto) containing identifiers of the previews pertaining to the movie stored on the DVD which is currently inserted into the player 105. Field 340 is preferably initialized to represent all of the previews on the DVD, and this value is then used when message 145 is transmitted. The value of field 340 may then be modified as discussed below with reference to flows 150, 155, and 165.

Returning again to the discussion of FIG. 1, upon receiving message 145 and the data structure 300 contained therein, the provider may optionally perform filtering as discussed earlier, which may comprise removing from the provider's copy of field 340 the identifiers of movies that the user has already rented from this provider or which are already stored in the user's future rentals list, as shown at 150. In addition or instead, the provider may optionally perform filtering to remove from field 340 the identifiers of movies which do not meet criteria established by the user. As discussed earlier, these criteria may provide parental controls or other user preferences, and as shown at 155, identifiers may be removed accordingly from field 340. The filtered list is then returned in a message from the provider to the player, as shown at 160. Preferably, message 160 transmits a data structure such as data structure 400 of FIG. 4, which is discussed below.

Optionally, when identifiers are removed from the preview list by filtering, one or more substitute previews may be identified, and the identifiers of those substitute previews may be inserted into the preview list prior to returning the list to the player. The substitute previews may be selected, for example, by evaluating the user's previous rental habits—for example, by determining the user's previous rental selections and identifying titles which are commonly selected by other users who also chose the user's previous rental selections. Preferably, these substitute previews are checked to ensure that they meet the user's filtering criteria. Content for the substitute previews, or information usable for obtaining that content (such as a Uniform Resource Locator, or "URL", where the substitute preview is stored), may also be included in message 160.

Figure 4:
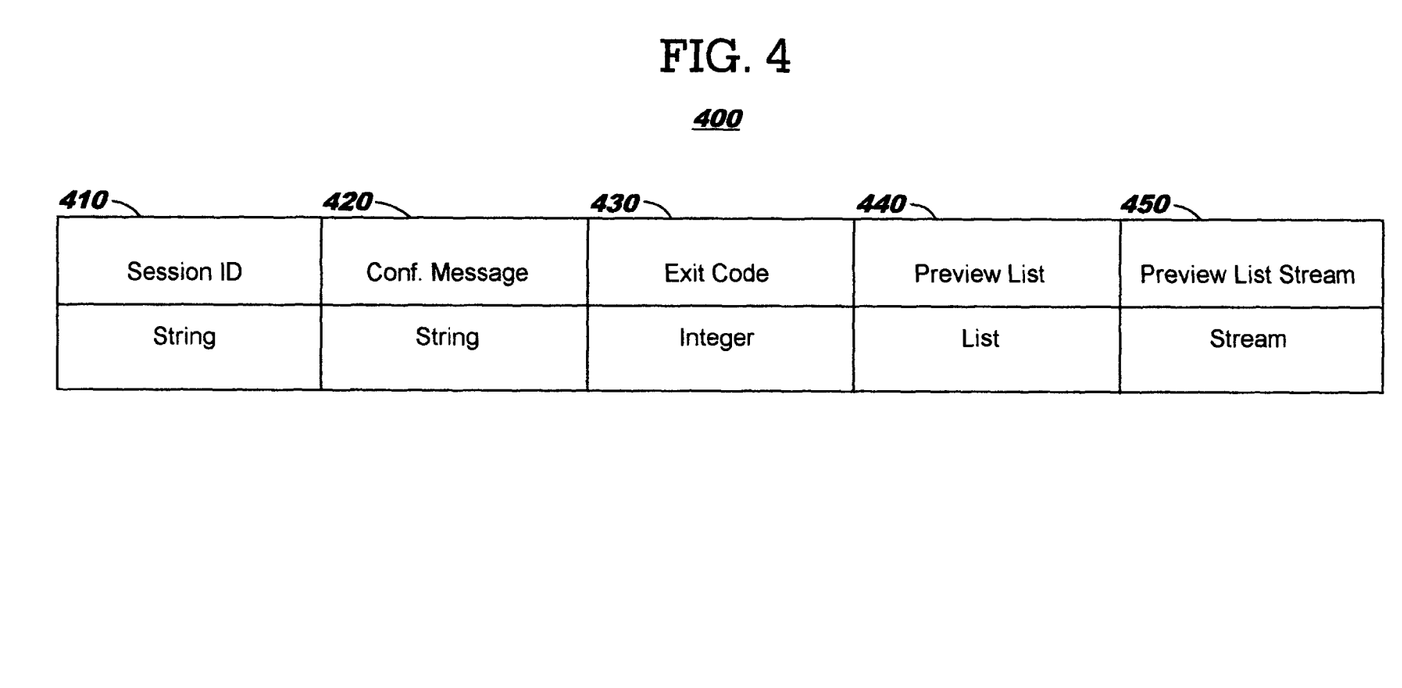

FIG. 4 illustrates a sample data structure 400 that may be stored at provider 110 and used for transmitting information to player 105 (for example, in message flows 160 and 190 of FIG. 1). In this example, a session identifier field 410 is provided for storing session information for the current session with the user's subscription account at rental media provider 110, and may comprise a string value (which may be identical to the value of field 310 of FIG. 3). A confirmation message field 420 is also provided in this example, and may store a string containing message text for displaying to the user to indicate status of processing the user's request. For example, a message stating "Movie XYZ has been added to the future rentals list" might be contained in field 420 following the processing at 185 of FIG. 1, and may be sent to the player at 190 as discussed below. An exit code field 430 may be provided for storing an integer value that indicates whether processing completed successfully. A value of zero may be used to indicate success, whereas non-zero values may identify various error conditions. A preview list field 440 is depicted in data structure 400, where the value of this field 440 may comprise a list or an array (or as one alternative, a pointer thereto) containing identifiers of the previews which are identified as output of the filtering process at 150, 155. A preview list stream field 450 may also be provided in data structure 400, where the value of this field 450 may comprise a stream of new previews for playing at player 105 responsive to the rental media provider identifying substitute previews during a filtering process as described above. (Note that the substitute previews are not present on the currently-inserted DVD, and thus field 450 may contain the media content for such previews. As one alternative, a URL or other address from which media content for a substitute preview can be obtained may be specified in field 450.)

Returning again to the discussion of FIG. 1, upon receiving message 160 and the filtered preview list 440 contained therein, the player 105 plays the previews or trailers from the filtered list, as shown at 165. An embodiment of the present invention may remember each preview which has been played. In one approach, this may be done by removing, from the player's copy of field 440 of data structure 400, the identifiers of any available previews which are not played, and the result of this modification may be stored as a new value of field 340 of data structure 300. As one alternative to modifying field 340 in this manner, an additional field may be used in data structure 300 (not shown in FIG. 3) to record the identifiers of those previews which have been viewed. This field may be initialized to a null value, and the identifier of each preview which is played at 165 may then be inserted into a list or other data structure that overrides the null value.

Note that when filtering is not supported by an embodiment of the present invention, flows 145-160 may be omitted. In this case, the list of previews which are available for playing at 165 is obtained from the DVD, as discussed above with reference to flows 140 and 145, rather than from field 440 of data structure 400.

During the playing of each preview, an embodiment of the present invention preferably gives the user an option to add the corresponding movie title to the user's future rentals list, as noted at 170. If the user elects to add the title, as shown at 175, then data structure 300 is preferably updated by appending an identifier of that title to user selection field 330. Flows 170-175 may be repeated, depending on the number of previews which are played. (It may happen that the likelihood of the user electing to add at least one of the previewed titles to his future rentals list increases when the available previews list has been filtered to account for the user's existing future rentals list and/or preferences.)

Once the viewing of the previews and the user's selection of any titles of interest ends, the player sends a message identifying the selected title(s) to the provider, as shown at 180.

Responsive to receiving message 180 and the data structure 300 contained therein, the provider preferably extracts the selection list 330, uses the identifier for each of the selected titles represented therein to identify the corresponding movie, and then automatically adds that movie to the user's future rentals list, as shown at 185. When the optional filtering discussed above comprises suppressing the addition of titles that do not meet the user's filtering criteria, then for any of the identifiers in selection list 330 which represent titles to be suppressed, the provider does not add the corresponding movie to the future rentals list. For example, it may happen that playing of a preview for a movie in the horror film genre was not suppressed for a user who does not like such films, and this preview was inadvertently elected for adding at 175. At 185, the filtering at the rental media provider then enforces the user's preferences by not adding that movie to the future rentals list.

Optionally, a message may be transmitted from the provider 110 to the player 105 following the updating of the future rentals list at 185 to confirm that the list has been updated, as shown at 190. The processing of FIG. 1 then ends.

While the optional filtering process is described above as occurring at the provider 110, this filtering may occur at the player 105 in one alternative embodiment. As another alternative, suppressing the addition of titles that do not meet the user's filtering criteria may be performed at the player 105 instead of, or in addition to, the suppressing as discussed with reference to 185. If suppressing is performed at both locations, then whichever location has the most restrictive filtering criteria may supersede the filtering criteria of the other location.

Figure 5A:
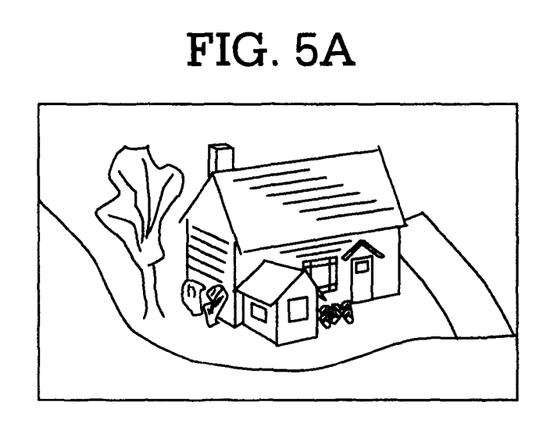
FIGS. 5A-5C provide graphics to illustrate a user's experience when interacting with an embodiment of the present invention.
Figure 5B:
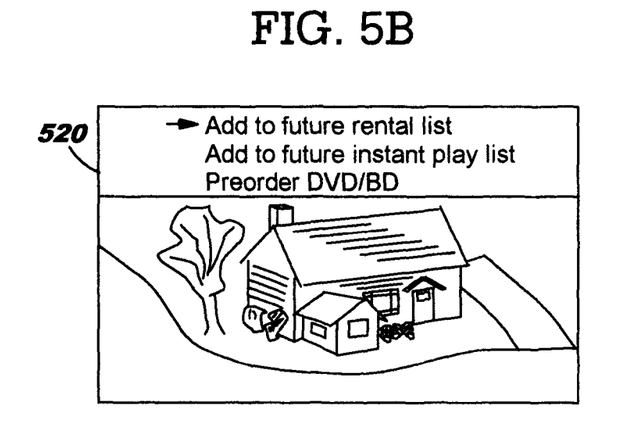
Figure 5C:
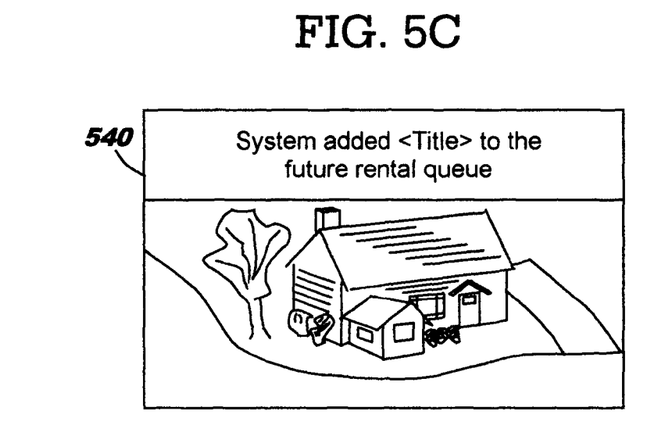

FIG. 5 (comprising FIGS. 5A through 5C) provides graphics to illustrate a user's experience when interacting with an embodiment of the present invention, as will now be discussed. (These graphics are provided primarily as line drawings, for ease of illustration, but should be understood to represent media content such as a video stream corresponding to a movie preview being viewed on a television.)

FIG. 5A represents a movie preview that is being displayed for a user with a playback device such as a DVD player coupled to a television. During this preview, the user can choose to add the corresponding movie title to his future rentals list. One way in which this may occur is by the user invoking a menu function—for example, by pressing a designated key on a remote control device associated with the television on which the preview is playing or by selecting a widget displayed on the television screen—to display a selection menu.

FIG. 5B illustrates a sample selection menu (see reference number 520) that may be displayed responsive to the user's menu function invocation. Note that this menu 520 is illustrated, by way of example, as being appended to the currently-viewed preview on the television; as one alternative, the menu might overlay the preview (at least partially). A first selectable choice provided in sample menu 520 is to add the movie title for the currently-played preview to the future rentals list. Selecting this choice corresponds generally to flow 175 as discussed above with regard to FIG. 1. Another selectable choice provided in sample menu 520 is to add this movie title to an instant play list. This option may be supported when the rental media provider 110 supports instant delivery (over an Internet connection, for example) of selected titles to the user's player 105. For cases where a preview corresponds to a movie title which is not yet released, a third selectable choice provided in sample menu 520 may be selected by the user to confirm that he wishes to place a pre-order for this movie title.

FIG. 5C illustrates a sample status message (see reference number 540) that may be displayed to the user who is watching a preview. Note that this status message 540 is illustrated, by way of example, as being appended to the currently-viewed preview on the television; as one alternative, the status message might overlay the preview (at least partially). The status message is illustrated at 540 as comprising a text message, and in the example of FIG. 5C, the status message informs the user that some movie title (to be substituted for the placeholder "<Title>") has been successfully added to the user's future rentals list. Displaying status message 540 may follow receipt of flow 190, which was discussed above with regard to FIG. 1.

The player 105 used in an embodiment of the present invention may be a prior art player that is augmented with programming code for performing the operations described with regard to FIGS. 1-5. As another alternative, player 105 may be a device which is specifically designed to include such programming code.

Figure 6:
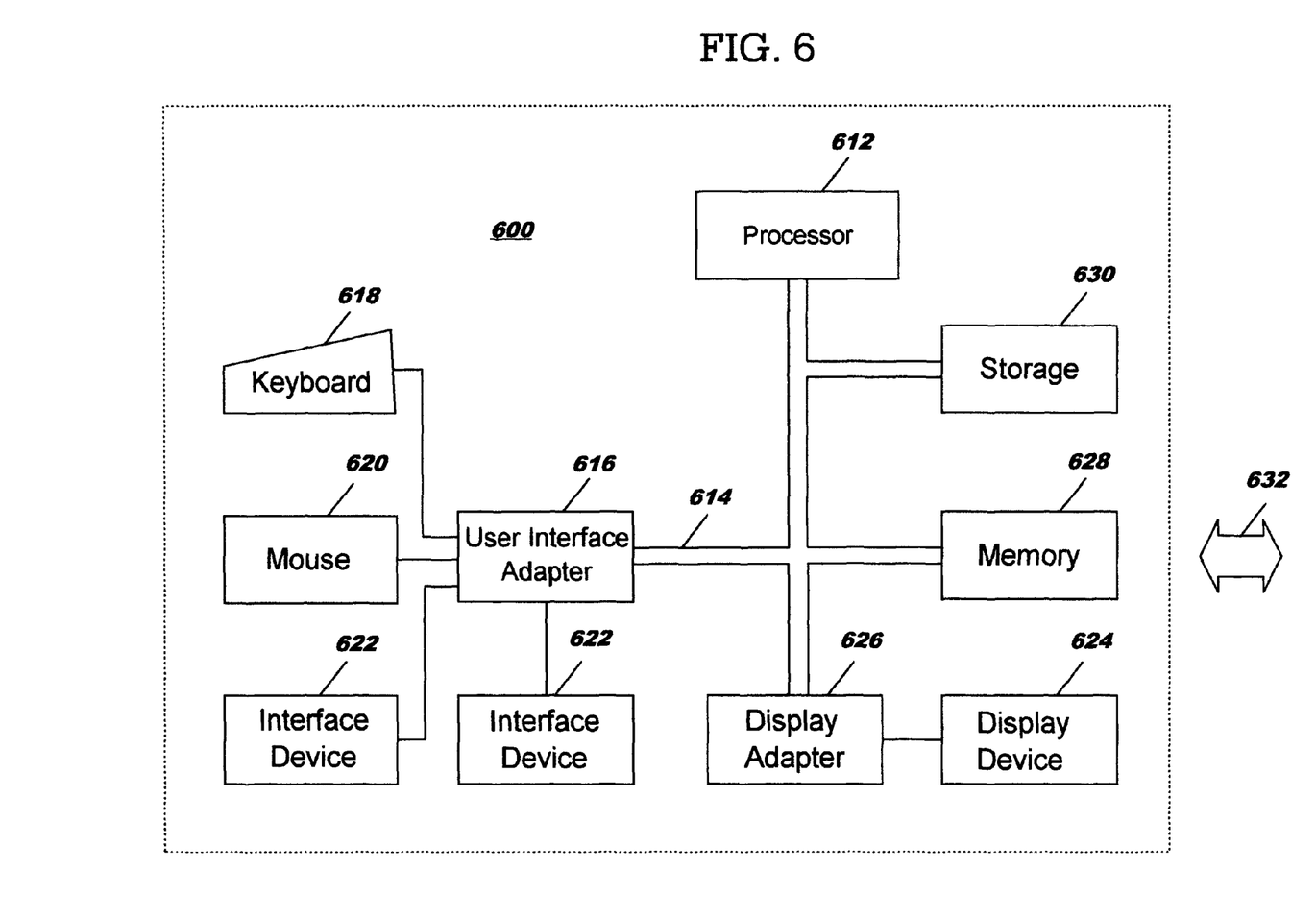
FIG. 6 depicts a data processing system suitable for storing and/or executing program code.

Referring now to FIG. 6, a data processing system 600 suitable for storing and/or executing program code includes at least one processor 612 coupled directly or indirectly to memory elements through a system bus 614. The memory elements can include local memory 628 employed during actual execution of the program code, bulk storage 630, and cache memories (not shown) which provide temporary storage of at least some program code in order to reduce the number of times code must be retrieved from bulk storage during execution.

Input/output ("I/O") devices (including but not limited to keyboards 618, displays 624, pointing devices 620, other interface devices 622, etc.) can be coupled to the system either directly or through intervening I/O controllers or adapters (616, 626).

Network adapters may also be coupled to the system to enable the data processing system to become coupled to other data processing systems or remote printers or storage devices through intervening private or public networks (as shown generally at 632). Modems, cable modem attachments, wireless adapters, and Ethernet cards are just a few of the currently-available types of network adapters.

Figure 7:
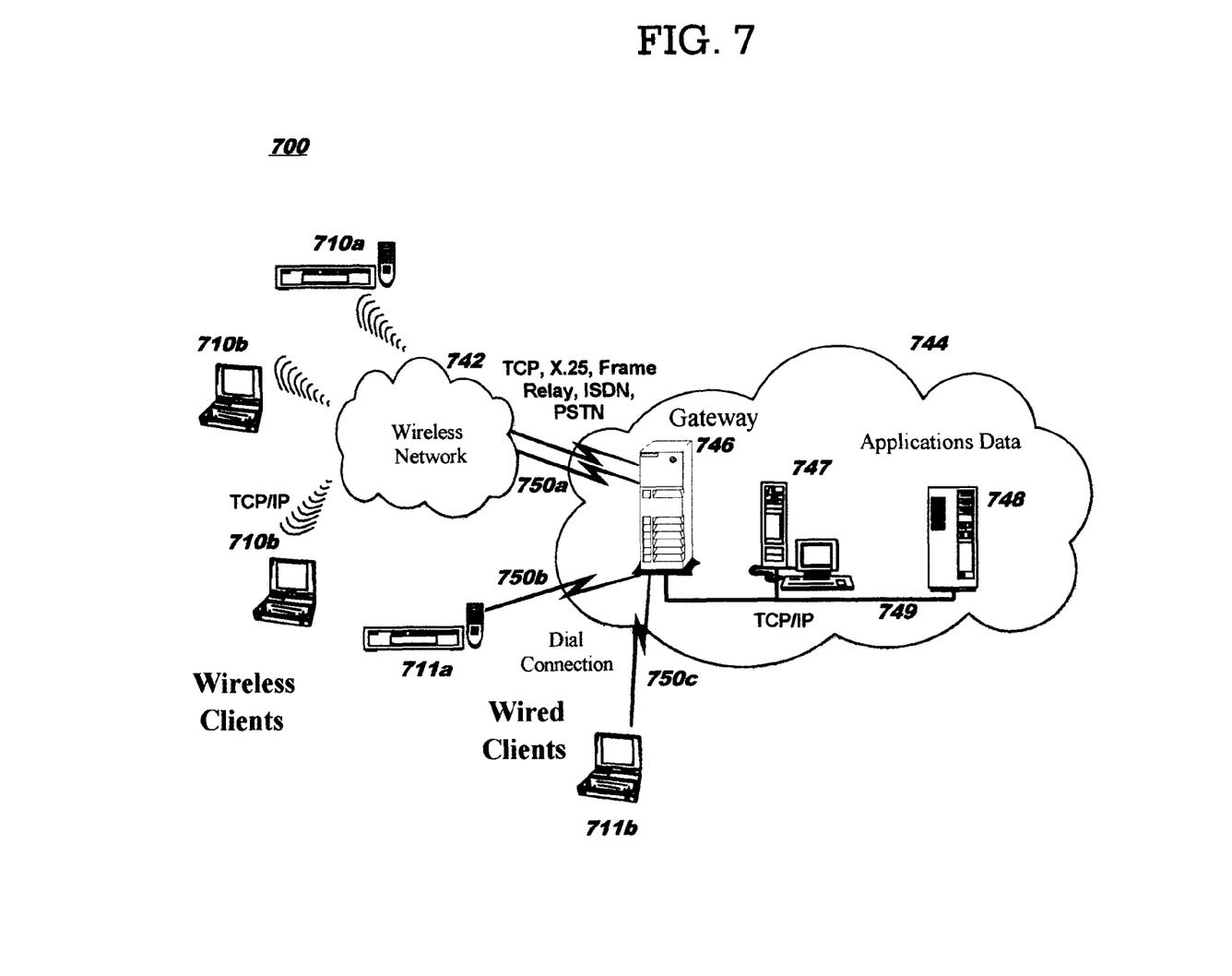
FIG. 7 depicts a representative networking environment in which one or more embodiments of the present invention may be used.

FIG. 7 illustrates a data processing network environment 700 in which the present invention may be practiced. The data processing network 700 may include a plurality of individual networks, such as wireless network 742 and wired network 744. A plurality of player devices 710*a*, 711*a* and optionally other devices 710*b*, 711*b* may communicate over wireless network 742 and/or over wired network 744, respectively.

Additionally, as those skilled in the art will appreciate, one or more local area networks ("LANs") may be included (not shown), where a LAN may comprise a plurality of devices coupled to a host processor.

Still referring to FIG. 7, the networks 742 and 744 may also include mainframe computers or servers, such as a gateway computer 746 or application server 747 (which may access a data repository 748). A gateway computer 746 serves as a point of entry into each network, such as network 744. The gateway 746 may be preferably coupled to another network 742 by means of a communications link 750a. The gateway 746 may also be directly coupled to one or more player devices 711 using a communications link 750b, 750c, and/or may be indirectly coupled to such devices. The gateway computer 746 may be implemented utilizing an Enterprise Systems Architecture/390® computer available from IBM. Depending on the application, a midrange computer, such as an Application System/400® (also known as an AS/400®), iSeries®, System i™, and so forth may be employed. ("Enterprise Systems Architecture/390", "Application System/400", "AS/400", and "iSeries" are registered trademarks of IBM in the United States, other countries, or both, and "System i" is a trademark of IBM.)

The gateway computer 746 may also be coupled 749 to a storage device (such as data repository 748).

Those skilled in the art will appreciate that the gateway computer 746 may be located a great geographic distance from the network 742, and similarly, the player devices 710a, 711a and/or other devices 710b, 711b may be located some distance from the networks 742 and 744, respectively. For example, the network 742 may be located in California, while the gateway 746 may be located in Texas, and one or more of the player devices 710a may be located in Florida. The player devices 710a may connect to the wireless network 742 using a networking protocol such as the Transmission Control Protocol/Internet Protocol ("TCP/IP") over a number of alternative connection media, such as cellular phone, radio frequency networks, satellite networks, etc. The wireless network 742 preferably connects to the gateway 746 using a network connection 750a such as TCP or User Datagram Protocol ("UDP") over IP, X.25, Frame Relay, Integrated Services Digital Network ("ISDN"), Public Switched Telephone Network ("PSTN"), etc. The player devices 711a may connect directly to the gateway 746 using dial connections 750b or 750c. Further, the wireless network 742 and network 744 may connect to one or more other networks (not shown), in an analogous manner to that depicted in FIG. 7.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java®, Smalltalk, C++, or the like, and conventional procedural programming languages such as the "C" programming language or similar programming languages. ("Java" is a registered trademark of Sun Microsystems, Inc. in the United States, other countries, or both.) The program code may execute as a stand-alone software package, and may execute partly on the user's playback device and partly on a remote computer associated with the rental media provider. The remote computer may be connected to the user's playback device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer program product for adding media titles to a list maintained by a media provider, the computer program product comprising:
   a computer readable storage medium having computer readable program code embodied therein, the computer readable program code configured to:
      determine, at a media provider for a recording medium that stores a media title for playing by a player device, a plurality of media title previews which are playable by the player device from the recording medium, the media title differing from media titles corresponding to the media title previews;
      apply filtering criteria to determine at least one particular one of the plurality of media title previews to be suppressed from playing by the player device;
      automatically select, for at least one of the at least one particular one, a substitute preview for playing in place of the media title preview to be suppressed;
      send a notification to the player device, from the media provider over a communication channel, to suppress the playing of each of the at least one particular one of the media title previews, the notification further comprising an identification of each automatically-selected substitute preview for playing in place of the preview to be suppressed;
      receive, at the media provider over the communication channel from the player device, a message indicating each played media title preview which was selected, during the playing of the media title previews, for adding the corresponding media title to a list maintained by the media provider; and
      add the media title corresponding to each of the selected media title previews indicated in the message, by the media provider, to the list.

2. The computer program product according to claim 1, wherein the media provider comprises a rental media provider and the list comprises a future rentals list usable by the rental media provider for determining media content to be rented to a user.

3. The computer program product according to claim 1, wherein the computer readable program code is further configured to send a subsequent notification to the player device, over the communication channel, indicating any of the selected media title previews for which the corresponding media title is not yet available for adding to the list.

4. The computer program product according to claim 1, wherein the computer readable program code is further configured to suppress the adding of any of the selected media titles for which the filtering criteria are not met.

5. A method for adding media titles to a list maintained by a media provider, the method comprising:
   determining, at a media provider for a recording medium that stores a media title for playing by a player device, a plurality of media title previews which are playable by the player device from the recording medium, the media title differing from media titles corresponding to the media title previews;
   applying filtering criteria to determine at least one particular one of the plurality of media title previews to be suppressed from playing by the player device;
   automatically selecting, for at least one of the at least one particular one, a substitute preview for playing in place of the media title preview to be suppressed;
   sending a notification to the player device, from the media provider over a communication channel, to suppress the playing of each of the at least one particular one of the media title previews, the notification further comprising an identification of each automatically-selected substitute preview for playing in place of the preview to be suppressed;
   receiving, at the media provider over the communication channel from the player device, a message indicating each played media title preview which was selected, during the playing of the media title previews, for adding the corresponding media title to a list maintained by the media provider; and
   adding the media title corresponding to each of the selected media title previews indicated in the message, by the media provider, to the list.

6. The method according to claim 5, wherein the media provider comprises a rental media provider and the list comprises a future rentals list usable by the rental media provider for determining media content to be rented to a user.

7. The method according to claim 5, further comprising:
   sending a subsequent notification to the player device, over the communication channel, indicating any of the selected media title previews for which the corresponding media title is not yet available for adding to the list.

8. The method according to claim 5, further comprising:
   suppressing the adding of any of the selected media titles for which the filtering criteria are not met.

9. A system for adding media titles to a list for future use, comprising:
   a computer comprising a processor; and
   instructions which are executable, using the processor, to implement functions comprising:

determining, at a media provider for a recording medium that stores a media title for playing by a player device, a plurality of media title previews which are playable by the player device from the recording medium, the media title differing from media titles corresponding to the media title previews;

applying filtering criteria to determine at least one particular one of the plurality of media title previews to be suppressed from playing by the player device;

automatically selecting, for at least one of the at least one particular one, a substitute preview for playing in place of the media title preview to be suppressed;

sending a notification to the player device, from the media provider over a communication channel, to suppress the playing of each of the at least one particular one of the media title previews, the notification further comprising an identification of each automatically-selected substitute preview for playing in place of the preview to be suppressed;

receiving, at the media provider over the communication channel from the player device, a message indicating each played media title preview which was selected, during the playing of the media title previews, for adding the corresponding media title to a list maintained by the media provider; and adding the media title corresponding to each of the selected media title previews indicated in the message, by the media provider, to the list.

10. The system according to claim 9, wherein the media provider comprises a rental media provider and the list comprises a future rentals list usable by the rental media provider for determining media content to be rented to a user.

11. The system according to claim 9, wherein the functions further comprise:

sending a subsequent notification to the player device, over the communication channel, indicating any of the selected media title previews for which the corresponding media title is not yet available for adding to the list.

12. The system according to claim 9, wherein the functions further comprise:

suppressing the adding of any of the selected media titles for which the filtering criteria are not met.

* * * * *